April 14, 1953     J. HARTEKER ET AL     2,634,788
MACHINE FOR STRAIGHTENING AUTOMOBILE FRAMES
Filed March 2, 1950     2 SHEETS—SHEET 1

*INVENTOR.*
JOSEPH HARTEKER &
WARREN R. HOEGNER
BY
*C.T. Parker*
ATTORNEY

April 14, 1953        J. HARTEKER ET AL        2,634,788
MACHINE FOR STRAIGHTENING AUTOMOBILE FRAMES
Filed March 2, 1950                                    2 SHEETS—SHEET 2

INVENTOR.
JOSEPH HARTEKER &
WARREN R. HOEGNER
BY
ATTORNEY

Patented Apr. 14, 1953

2,634,788

UNITED STATES PATENT OFFICE 2,634,788

MACHINE FOR STRAIGHTENING AUTOMOBILE FRAMES

Joseph Harteker, Oconomowoc, Wis., and Warren R. Hoegner, Moline, Ill.

Application March 2, 1950, Serial No. 147,168

4 Claims. (Cl. 153—32)

The present invention relates to machines for straightening automobile frames and bodies and has for its principal object the provision of a light, easily portable machine which can be easily maneuvered under an automobile and readily raised into an operating position in engagement with the chassis of the latter. Another object relates to the provision of a portable machine of this type in which the frame straightening forces are transmitted to the automobile chassis without imposing excessive stresses in the supporting parts of the machine, thus obtaining strength without involving excessive bulk and weight in construction.

These and other objects and advantages of the invention will become apparent to those skilled in the art after a consideration of the following description in which reference is made to the drawings appended hereto, in which Figure 1 is a top plan view of a frame straightening machine embodying the principles of this invention.

Figure 1:
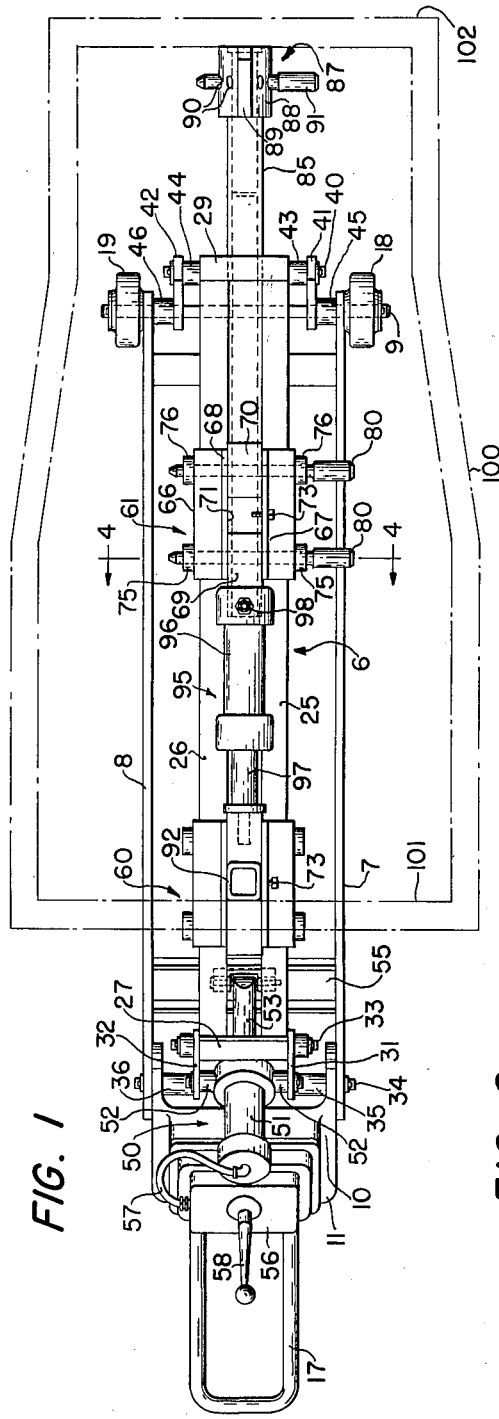
Figure 2:
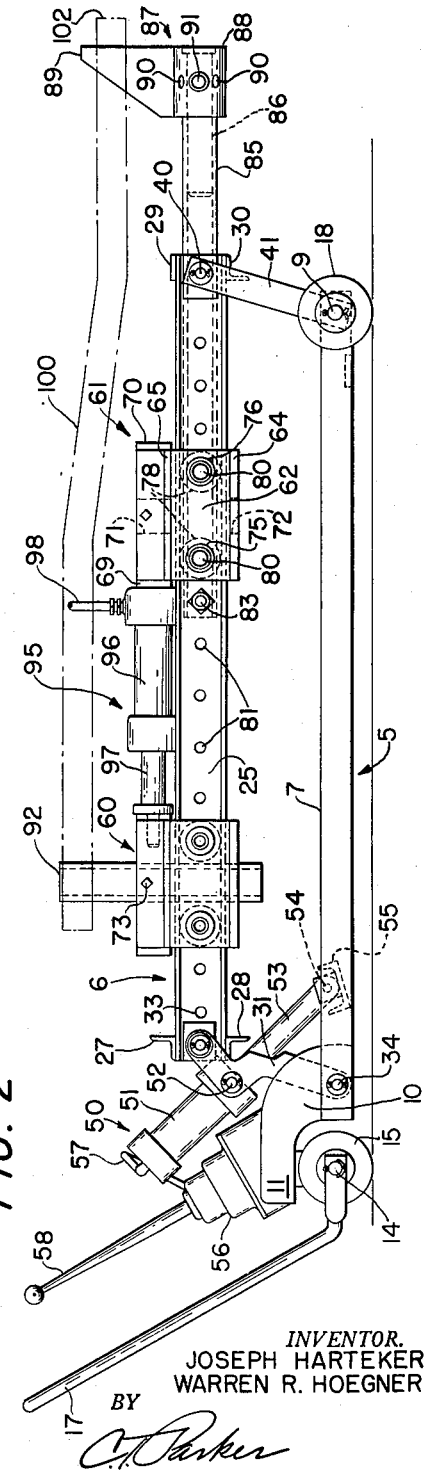
Figure 2 is a side elevational view.
Figure 3:
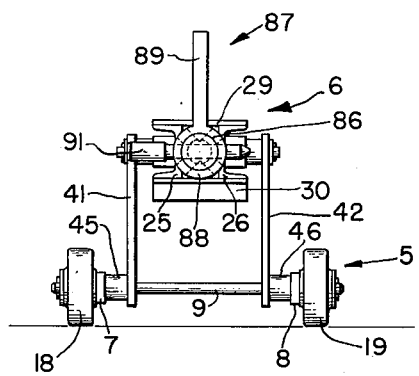
Figure 3 is a rear end view.
Figure 4:
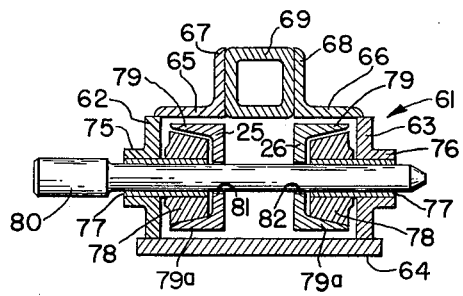
Figure 4 is a sectional elevational view taken along a line 4—4 in Figure 1 and drawn to an enlarged scale.
Figure 5:
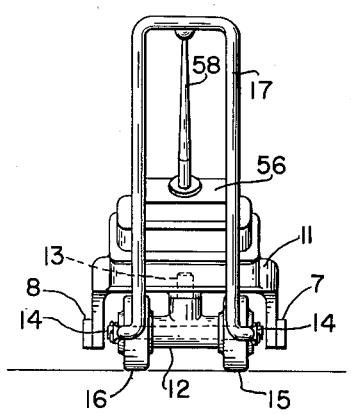
Figure 5 is a front end elevation.

Referring now to the drawings, the frame straightening machine comprises generally an elongated carriage 5 and a main longitudinally extending frame 6 carried thereon. The carriage 5 comprises a long narrow chassis including a pair of longitudinally extending laterally spaced structural members 7, 8, carried at their rear ends on a rear axle 9 and rigidly interconnected at their forward ends by a draft yoke 10. The yoke 10 has a forwardly and upwardly projecting support 11 mounted on a dirigible truck comprising a truck frame 12 connected with the support 11 by a king pin 13 and having laterally extending trunnions 14, and a pair of supporting wheels 15, 16 journaled on the trunnions 14. A handle 17 in the form of a bail is connected to the outer ends of the axle 14. The rear axle 9 is mounted on a pair of supporting wheels 18, 19. Thus, the carriage 5 can be propelled manually through the handle 17, which is also used to steer the carriage.

The main frame 6 comprises a pair of laterally spaced, longitudinally extending structural channel beams 25, 26, positioned with their flanges extending laterally outwardly in opposed relation. The forward ends of the beams 25, 26 are rigidly interconnected, as by welding, by a pair of upper and lower structural angle members 27, 28, and the rear ends of the beams are likewise interconnected rigidly by upper and lower members 29, 30, thus forming a rigid unitary main frame 6. The frame 6 is carried on the carriage 5 by means of parallel arms or links providing for vertical movement of the main frame 6 relative to the carriage 5. The front end of the frame 6 is pivotally mounted on the outer ends of a pair of laterally spaced arms 31, 32 by means of a pivot shaft 33. The opposite ends of the arms 31, 32 are pivotally mounted by means of a shaft 34 on the carriage 5. The shaft 34 extends transversely between the two carriage frame members 7, 8. The arms 31, 32 are provided with mounting hubs 35, 36, respectively, journaled on the shaft 34.

The rear end of the frame 6 is pivotally mounted by means of a transverse pivot shaft 40 on the outer ends of a pair of laterally spaced supporting arms or links 41, 42, each of which has a mounting hub 43, 44, journaled on the shaft 40, which extends through aligned openings in the two channels 25, 26. The inner ends of the links 41, 42 have mounting hubs 45, 46, respectively, which are journaled on the rear axle 9.

By virtue of the fact that the front arms 31, 32 are substantially parallel to the rear arms 41, 42 and the distances between the inner and outer pivots are equal in the two pairs of arms, the main frame 6 swings on its supporting arms toward and away from the carriage frame maintaining a parallel relation to the latter. The frame 6 is raised and lowered by a hydraulic ram 50 comprising a cylinder 51 having trunnions 52 pivoted on the arms 31, 32, respectively, near their outer pivot shaft 33, the ram piston rod 53 being pivotally connected at 54 to a transverse channel member 55 rigidly interconnecting the carriage frame members 7, 8.

The ram 50 can be extended or retracted to raise and lower the main frame 6 by means of a hand operated hydraulic pump 56 of any suitable conventional construction, hydraulically connected with the cylinder 51 by a flexible hose 57. The pump is mounted on the raised portion 11 of the yoke 10 and is provided with a pump handle 58 reciprocable to operate the pump in raising the frame 6.

A pair of front and rear abutment fixtures 60, 61 are slidable along the main frame, but inasmuch as the two fixtures are alike, a description of one will suffice for both. The rear fixture 61 comprises a box member having a pair of side walls 62, 63 positioned along the outer sides of the channels 25, 26 and interconnected by a transverse bottom wall comprising a plate 64. The upper edges of the side walls are interconnected by a top wall comprising a pair of longitudinally extending structural angles 65, 66 fixed as by welding to the side walls 62, 63, respectively, and having vertical flanges 67, 68, between which are welded a pair of fore and aft extending tubular members 69, 70 of rectangular cross section. The members 69, 70 are spaced apart to provide a rectangular aperture 71 therebetween, and the bottom plate 64 has a rectangular aperture 72 disposed in vertical register with the aperture 71. A set screw 73 extends into the aperture 71 through a suitable threaded opening in the vertical flange 67 of one of the angles 65 for a purpose to be described later.

Each of the side walls 62, 63 is provided with a pair of longitudinally spaced, outwardly directed hubs 75, 76, in each of which is fixed a hollow trunnion 77 extending inwardly and terminating adjacent the vertical channels 25, 26, respectively, between the upper and lower flanges 79, 79a of the latter. Journaled on the four hollow trunnions are wheels 78 disposed to roll between the upper and lower flanges 79, 79a. The flanges 79, 79a of each of the beams converge inwardly and the wheels 78 are conically shaped to roll between the flanges.

The two oppositely disposed front trunnions 78 are in transverse axial alignment, as are the two rear trunnions, and a locking pin 80 is adapted to be slidably inserted through either pair of aligned hollow trunnions when the abutment fixture is shifted on the beams 25, 26 to a position in which the trunnions are in register with any pair of axially aligned holes 81, 82 in the beams 25, 26. There are several of such pairs of aligned holes located at intervals along the beams 25, 26, to provide a number of longitudinally spaced positions in which the two abutment fixtures 60, 61 can be locked to the main frame against longitudinal sliding movement.

A frame extension member 85 of rectangular tubular construction is adjustable longitudinally between the beams 25, 26 and secured by one or more bolts 83 inserted through openings in register with the holes 81, 82. The member 85 projects rearwardly therefrom in fixed relation to the frame 6. A stub shaft 86 of circular cross section is fixed in the rear end of the extension member 85 and carries an abutment fixture 87 comprising a hub 88 and a plate 89 rigidly fixed thereto and extending radially therefrom. A number of angularly spaced radially extending apertures 90 are provided in the hub 88 to receive a locking pin 91, which can be inserted through the apertures and through an aligned aperture in the stub shaft 86 to lock the plate 89 in several positions of angular adjustment relative to the shaft 86.

A vertical post 92 of rectangular tubular construction can be inserted through the apertures 71, 72 in either of the abutment fixtures and secured in any vertically adjusted position by tightening the set screw 73.

A hydraulic cylinder and piston assembly or ram 95 is positioned between the two fixtures 60, 61 with the cylinder 96 in abutment with one of the fixtures 61 and the piston rod 97 in abutment with the other fixture 60. With one of the fixtures, for example the rear fixture 61 locked to the frame 6 by the pin 80, expansion of the ram 95 forces the other fixture 60 forwardly along the beams 25, 26. Hydraulic pressure is applied to the ram 95 through a flexible hose 98 by means of any suitable pump (not shown), either manually or power operated.

The machine can be operated in many different ways, depending upon the work to be done. In general, the principal function of the machine is to apply a tensional force to parts of a damaged automobile frame or the sheet metal body to stretch the latter back into proper shape. The force is imposed on the frame by engaging the latter by two of the abutment fixtures, one of which is fixed to the main frame 6 and the other is slidable therealong. Then by shifting the slidable fixture in a direction away from the fixed one, the tensional force is exerted on the automobile. Where two parts of the automobile chassis are comparatively close together, such as the two fore and aft side members, the two shiftable fixtures 60, 61 can be used by inserting a vertical post 92 in each of the fixtures, locking one of them to the frame by the pin 80, and exerting pressure between the two fixtures.

Where the force is needed between two remote parts of the chassis 100, as between the front and rear portions thereof, the extension element 85 is used, with the fixed abutment 87 in engagement with one end frame member 102 and the shiftable abutment 60 in engagement with the other end frame member 101, as illustrated. The reaction of the cylinder 96 is, however, taken on the rear abutment fixture 61, which is locked to the frame 6.

The machine is very versatile and is easily maneuvered into position underneath a wrecked chassis by pushing it by means of the handle 17 and with the arms 31, 41 lowered. The machine is run under the chassis either longitudinally or transversely of the latter, as desired. Then the main frame 6 is raised into engaged position by pumping the handle 58. In some cases, the vertical post 92 can be engaged directly with the chassis and in others it is desirable to attach it by means of a chain. Various means for clamping or otherwise securing the posts 72 to parts of the chassis or automobile body are known to those skilled in the art and are not an essential part of this invention.

Where the abutment plate 89 projects upwardly too high and interferes with the chassis, the pin 91 can be removed and the plate 89 adjusted angularly to clear the obstruction.

We do not intend our invention to be limited to the particular details shown and described herein, except as set forth in the following claims.

We claim:

1. In a frame straightening machine, a main frame comprising a horizontal beam having vertically spaced horizontal flanges, an abutment fixture shiftable longitudinally on said beam and comprising a box member having side walls and top and bottom walls enclosing said beam, longitudinally spaced trunnions mounted on one of said side walls and extending inwardly thereof between the upper and lower flanges, and wheels journaled on said trunnions and disposed between said flanges to roll thereon and disengageable means for securing said fixture against shifting movement along said beam.

2. In a frame straightening machine, a main frame comprising a pair of horizontal laterally spaced channel beams having vertically spaced flanges extending laterally outwardly, an abutment fixture shiftable longitudinally on said frame and comprising a box member having side walls and top and bottom walls enclosing said beams, longitudinally spaced trunnions mounted on each of said side walls and extending inwardly thereof between the upper and lower flanges, and wheels journaled on said trunnions and disposed between said flanges to roll thereon and disengageable means for securing said fixture against shifting movement along said beam.

3. In a frame straightening machine, a main frame comprising a horizontal beam having vertically spaced horizontal flanges, an abutment fixture shiftable longitudinally on said beam and comprising a box member having side walls and top and bottom walls enclosing said beam, longitudinally spaced trunnions mounted on one of said side walls and extending inwardly thereof between the upper and lower flanges, at least one of said trunnions being provided with an axially extending opening, wheels journaled on said trunnions and disposed between said flanges to roll thereon, and a locking pin insertable through said trunnion opening, said beam being provided with longitudinally spaced apertures adapted to register with said trunnion opening to receive said locking pin to hold said fixture against shifting movement along said beam.

4. In a frame straightening machine, a main frame comprising a pair of horizontal laterally spaced channel beams having vertically spaced flanges extending laterally outwardly, an abutment fixture shiftable longitudinally on said frame and comprising a box member having side walls and top and bottom walls enclosing said beams, longitudinally spaced trunnions mounted on each of said side walls and extending inwardly thereof between the upper and lower flanges, one opposed pair of said trunnions being provided with axially extending registering openings, wheels journaled on said trunnions and disposed between the upper and lower flanges to roll thereon, and a locking pin insertable through said registering trunnion openings, said beams being provided with longitudinally spaced apertures adapted to register with said trunnion openings to receive said locking pin to lock said fixture in adjusted position on said beams.

JOSEPH HARTEKER.
WARREN R. HOEGNER.

References Cited in the file of this patent

UNITED STATES PATENTS

| Number | Name | Date |
|---|---|---|
| 170,461 | Atkinson | Nov. 30, 1875 |
| 1,045,120 | Burroughs | Nov. 26, 1912 |
| 1,060,365 | Rowe | Apr. 29, 1913 |
| 1,248,929 | Schubert | Dec. 4, 1917 |
| 2,013,785 | Merrill | Sept. 10, 1934 |
| 2,140,686 | Bennett | Dec. 20, 1938 |
| 2,165,503 | Pfauser | July 11, 1939 |

FOREIGN PATENTS

| Number | Country | Date |
|---|---|---|
| 119,363 | Australia | Dec. 15, 1944 |